(12) United States Patent
Nakazawa et al.

(10) Patent No.: US 6,689,456 B2
(45) Date of Patent: Feb. 10, 2004

(54) MAGNETIC RECORDING MEDIUM, A MANUFACTURING METHOD THEREOF, AND A MAGNETIC RECORDING UNIT USING THEREOF

(75) Inventors: Tetsuo Nakazawa, Nishiibaraki (JP); Yuzo Kozono, Hitachioota (JP); Takashi Naito, Mito (JP); Tatsumi Hirano, Hitachinaka (JP); Hiroki Yamamoto, Hitachi (JP); Takashi Namekawa, Hitachi (JP); Yasutaka Suzuki, Taga (JP)

(73) Assignee: Hitachi, Ltd., Tokyo (JP)

( * ) Notice: Subject to any disclaimer, the term of this patent is extended or adjusted under 35 U.S.C. 154(b) by 92 days.

(21) Appl. No.: 09/794,330

(22) Filed: Feb. 28, 2001

(65) Prior Publication Data

US 2002/0034665 A1 Mar. 21, 2002

(30) Foreign Application Priority Data

Feb. 29, 2000 (JP) .......................... 2000-058029
Dec. 5, 2000 (JP) .......................... 2000-370140

(51) Int. Cl.[7] .......................... G11B 5/851; G11B 5/62; H01F 10/08; H01F 10/10; H01F 10/30
(52) U.S. Cl. .................. 428/332; 428/336; 428/694 T; 428/694 TS; 204/192.1; 204/192.2
(58) Field of Search .......................... 428/558, 561, 428/640, 641, 323, 328, 329, 694 TS, 332, 900, 156, 409, 655, 141, 336, 694 T; 204/192.1, 192.2

(56) References Cited

U.S. PATENT DOCUMENTS

| | | | | |
|---|---|---|---|---|
| 5,658,659 A | * | 8/1997 | Chen et al. | 428/332 |
| 5,750,273 A | * | 5/1998 | Inoue et al. | 428/692 |
| 5,837,392 A | * | 11/1998 | Kitori et al. | 428/692 |
| 5,851,643 A | * | 12/1998 | Honda et al. | 428/212 |
| 6,139,950 A | * | 10/2000 | Wu et al. | 428/332 |

FOREIGN PATENT DOCUMENTS

| | | | |
|---|---|---|---|
| JP | 63-098855 | * | 4/1988 |
| JP | 06-302432 | * | 10/1994 |
| JP | 07311929 | * | 11/1995 |
| JP | 08-227813 | * | 9/1996 |
| JP | 08-273930 | * | 10/1996 |
| JP | 11-66533 | * | 3/1999 |

* cited by examiner

*Primary Examiner*—Paul Thibodeau
*Assistant Examiner*—Nikolas J. Uhlir
(74) *Attorney, Agent, or Firm*—Antonelli, Terry, Stout & Kraus, LLP (57) ABSTRACT

A magnetic recording medium comprising a substrate 1, an inorganic compound layer 2 which works as a shielding layer, a magnetic layer 3 and a protective layer 4 which are laminated on said substrate; wherein said inorganic compound layer 2 comprises column-like crystal particles 6 and amorphous grain boundary phases isolating said particles 6, wherein said magnetic layer 3 has magnetic particles 14 arranged regularly and epitaxially grows on said inorganic compound layer 2, and wherein the grain sizes and the standard grain size deviation of magnetic particles 14 of said magnetic layer 3 reflect those of said inorganic compound layer 2.

20 Claims, 4 Drawing Sheets

MAGNETIC RECORDING MEDIUM, A MANUFACTURING METHOD THEREOF, AND A MAGNETIC RECORDING UNIT USING THEREOF

BACKGROUND OF THE OF THE INVENTION

This invention relates to a high-performance and high-reliability magnetic recording medium, a method thereof, and a magnetic recording unit using thereof.

Japanese Laid-open Patent Publication No. 10-177712 (1998) has disclosed a magnetic recording medium comprising a glass substrate, a first under layer comprising tantalum (Ta) and boron (B), a second under layer mainly comprising chromium (Cr), and a magnetic layer which are laminated on said substrate; wherein said first under layer works to adjust sizes of grains in the second ground and magnetic layers, and said ground and magnetic layers are formed with the fine crystals of said first under layer directly reflected upon them. This invention is characterized by high coercive force and low noises.

Japanese Laid-open Patent Publication No. 6-259743 (1994) has disclosed a magnetic recording medium comprising a non-magnetic substrate, a second under layer having sodium chloride (NaCl) type crystal structure, a first under layer having a body-centered cubic structure, and a magnetic layer having a hexagonal close-packed structure which are laminated on said substrate. This invention is characterized by improved crystal orientation of the magnetic layers.

Japanese Laid-open Patent Publication No. 7-311929 (1995) has disclosed a magnetic recording medium having a thin magnetic layer on a NiP under layer wherein crystal particles in said magnetic layer are isolated from each other by a crystal grain boundary containing non-ferromagnetic non-metallic phase. This invention is characterized by high coercive force and low noises.

Japanese Laid-open Patent Publication No. 11-66533 (1999) has disclosed a magnetic recording medium forming a thin magnetic layer on a non-magnetic under layer made of one or more of metals Cr, Pt, Ta, Ni, Ti, Ag, Cu, Al, Au, W, Mo, Nb, V, Zr, and Zn; wherein lots of magnetic particles in said magnetic layer are isolated from each other by grain boundary comprising the same components as the magnetic particles. This invention is characterized by high coercive force and low noises.

SUMMARY OF THE INVENTION

However, the aforesaid conventional technologies have limitations on control of distributions of sizes of crystal particles in a magnetic layer constituting the magnetic recording disk medium. Therefore, the magnetic layer cannot be free from containing both fine and large particles. Information recorded on such magnetic layers would be affected and disturbed by magnetic fields (noises) leaking from surrounding larger particles or mutual actions of large particles. Such noises are enemies to super-high density recording of 20 Gbit/inch$^2$ or above.

One object of the present invention is to provide a magnetic recording medium fit for stable high-density recording and a method thereof.

Another object of the present invention is to provide a magnetic recording unit using said magnetic recording medium.

We inventors discovered that the size and distribution (or uniformity of grain size) of crystal particles in an inorganic compound layer are very dependent upon the size and distribution of a magnetic film by growing the magnetic film on the inorganic compound layer which comprises crystal particles and amorphous grain phase surrounding the crystal particles.

Further, we discovered that we could obtain a stable high-density recording magnetic film having fine magnetic particles of almost an identical size arranged regularly by narrowing the grain size distribution of the crystal particles in the inorganic compound layer, that is, controlling to have fine and uniform size of the crystal particles in the inorganic compound layer.

Further, we discovered that, for a magnetic layer comprising crystal magnetic particles and deposits (a grain boundary phase) formed around the magnetic particles, the magnetic particles of the magnetic layer are finer and their grain sizes are uniform.

Furthermore, an intermediate layer can be provided between the inorganic compound layer and the magnetic layer. We discovered that we could control the particular structure of the magnetic layer by controlling the size and distribution of the crystal particles of the intermediate layer. Particularly, when a magnetic layer comprises crystal magnetic particles and deposits (a grain boundary phase) formed around the magnetic particles, we discovered that the magnetic particles of the magnetic layer were finer and their grain sizes were uniform. Below will be explained the summary of the present invention.

(1) A magnetic recording medium comprising a substrate and a plurality of information-recording magnetic layers laminated on said substrate, further comprising an inorganic compound layer containing crystal particles and amorphous grain boundary phases surrounding said particles between said substrate and said magnetic layers; wherein said magnetic layers contains crystal magnetic particles whose mean grain size is 4 nm to 15 nm and the standard deviation of the grain size ($\sigma$) is 25% or less of said mean grain size.

(2) Said magnetic layers are on said magnetic recording medium comprising crystal magnetic particles and an amorphous grain boundary phase surrounding said magnetic particles.

(3) Said inorganic compound layer comprises a first component containing sodium chloride (NaCl) or spinel type crystal oxide and a second component containing oxide, nitride, or boride of elements belonging to Groups I to V of the periodic table. Said particles and said grain boundary phase contain both the first and second components and said particles contain more first component than said grain boundary phase.

The inorganic compound layer fit for the magnetic recording medium according to the present invention contains (a) a first component comprising sodium chloride (NaCl) or spinel type crystal oxide and (b) a second component comprising at least one of oxide, nitride, and boride of elements belonging to Groups I to V of the periodic table.

An oxide having the sodium chloride (NaCl) type crystal structure can be one selected from a group of cobalt oxide (CoO), ferric oxide (Fe$_2$O$_3$), magnesium oxide, manganese oxide, titanium oxide, copper oxide or nickel oxide.

Similarly, a spinel type crystal oxide can be selected from cobalt oxide (Co$_3$O$_4$) or ferrous oxide (Fe$_3$O$_4$).

Said crystal particle of the inorganic compound layer contains 65% to 98% by weight of oxide (a) and 35% to 2% by weight of oxide (b) and said grain boundary phase contains 50% to 90% by weight of oxide (a) and 50% to 10% by weight of oxide (b). Both the crystal particles and the grain bound a ryphase preferentially contain oxides (a) and (b). Further, the crystal particle of the inorganic compound layer should always contain greater oxide (a) than the grain boundary phase. Here, the mean grain size, the standard deviation ($\sigma$) of grain size, the short diameter to long diameter ratio of said particle, and the grain boundary phase width should be respectively 4 nm to 15 nm, 25% or less of said mean grain size, 0.7 to 1.0 and 0.1 nm to 2 nm in that order.

The magnetic layer formed on the inorganic compound layer is a ferromagnetic layer which is an alloy of cobalt (Co) as a main component, platinum (Pt), and at least one selected from a group of elements chrome (Cr), tantalum (Ta), and niobium (Nb). This ferromagnetic layer has a structure in which at least one of chrome (Cr), tantalum (Ta), and niobium (Nb) is deposited between the crystal particles mainly comprising cobalt (Co) and other crystal particles.

The sizes and size distribution of magnetic particles in the magnetic layer are approximately equal to those of the inorganic compound layer due to the particle structure of the inorganic compound layer reflecting the magnetic particles in the magnetic layer. Therefore, the magnetic layer can have fine magnetic particles of uniform size.

At least one of oxide, nitride, and boride of elements belonging to Groups I to V of the periodic table can be deposited on the boundary of the magnetic particles. In this case, the sizes and size distribution of magnetic particles in the magnetic layer are approximately equal to those of the inorganic compound layer. The mean grain size, the short diameter to long diameter ratio of said particle, and the standard deviation ($\sigma$) of grain size are respectively 4 nm to 15 nm, 0.7 to 1.0, and 25% or less of said mean grain size in that order.

If the difference between lattice constants of the crystal of the magnetic particles of the magnetic layer and the particles of the inorganic compound layer is ±10% or under, the sizes and size distribution of magnetic particles in the magnetic layer become closer to those of the inorganic compound layer.

The intermediate layer between the inorganic compound layer and the magnetic layer uses a chrome-related metal layer. The sizes and size distribution of metal particles in the intermediate layer reflect the particle structure of the inorganic compound layer and the sizes and size distribution of magnetic particles in magnetic layer reflect the particle structure of metal particles of the inorganic compound layer. In other words, the sizes and size distribution of magnetic particles in the magnetic layer are approximately equal to those of the inorganic compound layer and we can obtain a magnetic layer of fine particles of uniform sizes.

At least one of oxide, nitride, and boride of elements belonging to Groups I to V of the periodic table can be deposited on the boundary of the Cr-related metal particles of the intermediate layer. In this case, the sizes and size distribution of magnetic particles in the magnetic layer becomes closer to those of the inorganic compound layer.

DETAILED DESCRIPTION OF PREFERRED EMBODIMENTS

Manufacturing Method

Below will be explained a method of forming an inorganic compound layer on a substrate in accordance with the present invention. This method sputters the following two targets (a) and (b) simultaneously or sputters a mixture of these two targets (a) and (b):

(a) target comprising oxide of the sodium chloride (NaCl) or spinel type crystal structure;

(b) Target comprising at least one of oxide, nitride, and boride of elements belonging to Groups I to V of the periodic table.

To form said magnetic layer on the inorganic compound layer, this method simultaneously sputters a first target comprising cobalt (Co) as a main component, platinum (Pt) and at least one of chromium (Cr), tantalum (Ta), and niobium (Nb), and a second target comprising at least one of oxide, nitride, and boride of elements belonging to Groups I to V of the periodic table or sputters a mixture of these two targets.

In this case, it is preferable to control the mixture ratio of the target materials so that the material may contain 65% to 98% by weight of an oxide which is the first component and 35% to 2% by weight of oxide, nitride, or boride which is the second component.

By sputtering, magnetic particles of the magnetic layer epitaxially grow on the crystal particles of the inorganic compound layer. The resulting magnetic layer has fine particles of uniform grain size.

To form a chrome-related intermediate metal layer on the inorganic compound layer, this method simultaneously sputters a first target mainly comprising chrome (Cr) and a second target comprising at least one of oxide, nitride, and boride of elements belonging to Groups I to V of the periodic table or sputters a mixture of these two target materials.

In this case, it is preferable to control the mixture ratio of the targets so that the material may contain 65% to 98% by weight of an oxide which is the first component and 35% to 2% by weight of oxide, nitride, or boride which is the second component.

By sputtering, crystal particles of the intermediate layer epitaxially grow on the crystal particles of the inorganic compound layer. The resulting intermediate layer has fine particles of uniform grain size. By forming a magnetic layer on this intermediate layer by sputtering as explained above, magnetic particles of the magnetic layer epitaxially grow on the crystal particles of the intermediate layer. The resulting magnetic layer has fine particles of uniform grain size.

For smooth growth of magnetic particles, size and distribution, it is preferable that the structure of crystal particles of the inorganic compound layer or the intermediate layer is equal or similar to the structure of the magnetic particles of the magnetic layer.

The above term "similar to" means that the difference between the lattice constant of the magnetic particles of the magnetic layer and the lattice constant of the crystal particles of the inorganic compound layer and the intermediate layer is ±10% or under, more preferably ±5% or under for smooth growth of crystals.

The resulting fine magnetic particles of uniform size in the magnetic layer can reduce noises, thermal fluctuation, thermal demagnetization, and the unit of inversion of magnetism. This is fit for high-density recording.

For example, the mean grain size, the short diameter to long diameter ratio, and the standard deviation (σ) of grain size of magnetic particles in the magnetic layer are respectively 4 nm to 15 nm, 0.7 to 1.0, 25% or less of said mean grain size in that order. This enables high-density recording of a coercive force of 3000 Oe or more, the unit of inversion of magnetism of 100 nm or under, and a density of 20 Gbit/inch$^2$ or above.

The unit of inversion of magnetism indicates how many magnetic particles in the magnetic layer are recorded or erased assuming that the minimum inversion unit is one magnetic particle of the magnetic layer. This can be determined by the use of a magnetic force microscope (MFM).

Embodiment 1

Figure 1:
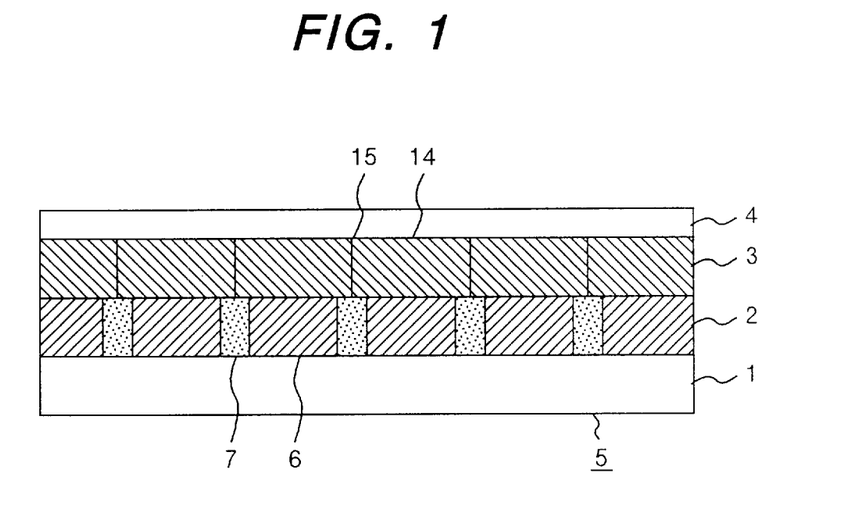
FIG. 1 is a schematic sectional diagram of a magnetic recording medium which is a first embodiment of the present invention.

FIG. 1 shows a cross-sectional view of a magnetic recording medium which is one embodiment of the present invention. The magnetic recording medium 5 comprises a substrate 1, an inorganic compound layer 2 which works as a shielding layer, a magnetic layer 3 which records information and a protective layer 4. These layers are formed on the substrate in that order. The inorganic compound layer 2 comprises column-like crystal particles 6 and amorphous grain boundary phases 7 which isolate particles 6 each other. The magnetic layer 3 comprises magnetic particles in arrangement. This invention terms a boundary between particles a grain boundary phase and a thick boundary having amorphous materials a grain boundary phase 7. The magnetic layer 3 of FIG. 1 has a grain boundary phase 15 between the magnetic particles 14.

This embodiment uses a 2.5'-diameter glass substrate on which an inorganic compound layer 2 of 30 nm thick is formed by simultaneous sputtering of a sintered target of cobalt oxide CoO and another sintered target of 2 molar parts of silicon oxide $SiO_2$ and 1 molar part of titanium oxide $TiO_2$.

The sputtering condition is pure argon (Ar) gas as a discharging gas for sputtering, discharging gas pressure of 2 mTorr, high-frequency power supply of 100 W to 1000 W/mm diameter at the cobalt oxide side, and high-frequency power supply of 100 W to 1000 W/mm diameter at the silicon oxide ($SiO_2$) titanium oxide ($TiO_2$) side.

The preferential thickness of the inorganic compound layer 2 is 5 nm to 50 nm. If the thickness of the inorganic compound layer 2 is thinner than 5 nm, the inorganic compound layer 2 is directly affected by the surface structure of the substrate and cannot fully show its characteristics. As the thicker inorganic compound layer can fully show the characteristics of the inorganic compound layer, the layer thickness 5 nm to 50 nm is enough for a under layer of the recording medium.

Table 1 shows the relationship of target, supply powers, components and characteristics of the resulting inorganic compound layer, and the validity of the obtained crystals.

TABLE 1

| | Target and supply power (W) | | Components of the inorganic compound layer (wt %) | | Inorganic compound layer | | | | |
|---|---|---|---|---|---|---|---|---|---|
| No. | CoO | $SiO_2$—$TiO_2$ | Crystal particle | Grain boundary | Mean grain size (nm) | Standard deviation/ Mean grain size × 100 (%) | Mean Short diameter/ Long diameter ratio | Crystal status | Remarks |
| 1 | 100 | 100 | CoO: 85 $SiO_2 + TiO_2$: 15 | CoO: 80 $SiO_2 + TiO_2$: 20 | 8.3 | 14.2 | 0.90 | ○ | — |
| 2 | 200 | 100 | CoO: 88 $SiO_2 + TiO_2$: 12 | CoO: 78 $SiO_2 + TiO_2$: 22 | 8.6 | 12.3 | 0.92 | ○ | — |
| 3 | 300 | 100 | CoO: 93 $SiO_2 + TiO_2$: 7 | CoO: 75 $SiO_2 + TiO_2$: 25 | 9 | 11.2 | 0.93 | ○ | — |
| 4 | 500 | 100 | CoO: 95 $SiO_2 + TiO_2$: 5 | CoO: 73 $SiO_2 + TiO_2$: 27 | 9.2 | 13.2 | 0.92 | ○ | — |
| 5 | 700 | 100 | CoO: 98 $SiO_2 + TiO_2$: 2 | CoO: 83 $SiO_2 + TiO_2$: 17 | 14.2 | 17.5 | 0.91 | ○ | — |
| 6 | 1000 | 100 | CoO: 99.5 $SiO_2 + TiO_2$: 0.5 | CoO: 90 $SiO_2 + TiO_2$: 10 | 18.6 | 25.6 | 0.65 | ○ | Comparative example |
| 7 | 200 | 400 | CoO: 80 $SiO_2 + TiO_2$: 20 | CoO: 53 $SiO_2 + TiO_2$: 47 | 8.1 | 12.8 | 0.89 | ○ | — |
| 8 | 200 | 800 | CoO: 78 $SiO_2 + TiO_2$: 22 | CoO: 50 $SiO_2 + TiO_2$: 50 | 7.2 | 18.6 | 0.88 | ○ | — |
| 9 | 200 | 1000 | CoO: 65 $SiO_2 + TiO_2$: 35 | CoO: 50 $SiO_2 + TiO_2$: 50 | 6.2 | 21.2 | 0.89 | ○ | — |
| 10 | 170 | 1000 | CoO: 63 $SiO_2 + TiO_2$: 37 | CoO: 45 $SiO_2 + TiO_2$: 55 | — | — | — | X | Comparative example |
| 11 | 300 | 0 | CoO: 100 | — | 20.3 | 26.1 | 0.60 | ○ | Comparative example |

Each of the resulting inorganic compound layers has particles 6 containing cobalt oxide dispersed in the layer. The particles 6 are oxides of the NaCl type crystal structure. Inorganic compound layers No. 1 to No. 5 and No. 7 to No. 9 have grain boundary phases 7 in the grain boundary but inorganic compound layers No. 6 and No. 11 have no grain boundary phase. Particles in inorganic compound layer No. 10 are not fully crystallized. Particles and grain boundary phases are hard to be distinguished from each other.

Inorganic compound layer No. 1 to No. 9 and No. 11 have good crystal particles 6. The mean grain size and the "Standard deviation (σ)/grain size×100" value of the inorganic compound layers except for No. 6 and No. 11 are respectively 15 nm or under and 25% or under. The mean grain size and the "Standard deviation (c)/grain size×100" value of inorganic compound layer 10 cannot be evaluated because its particles and grain boundary phases are hard to be distinguished from each other as explained above.

As seen from inorganic compound layers No. 6, No. 10, and No. 11, when the CoO component and the mixture of $SiO_2$ and $TiO_2$ components are not in the recommended ranges 65% to 98% by weight and 35% to 2% by weight respectively, particles 6 become less crystallized and the standard deviation (σ) of grain size of the particles becomes greater. This destroys the characteristics of the inorganic compound layers.

Figure 2:
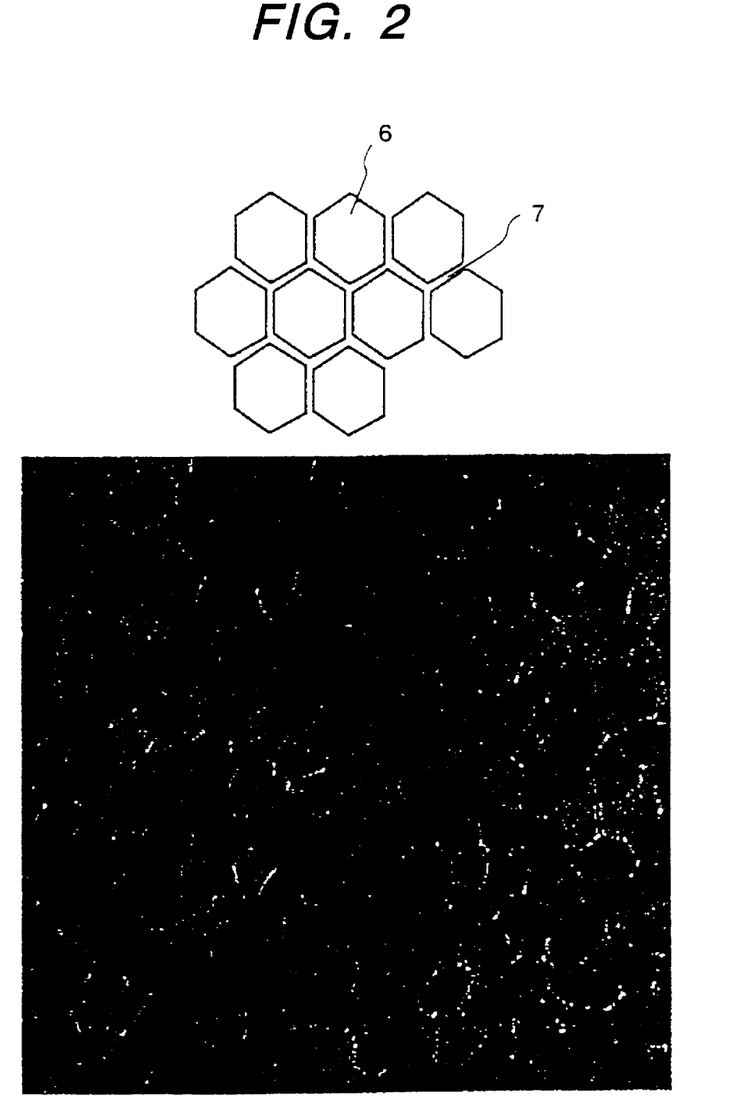
FIG. 2 is a TEM picture showing a typical structure of the inorganic compound layer.

FIG. 2 shows the top magnified view of the surface of inorganic compound layer 3 (by a transparent electron microscope (TEM)). As seen from this figure, particles 6 of the mean grain size of 9 nm are disposed regularly in rows and in lines. As the result of TEM observation of the surfaces of the other inorganic compound layers, the particles 6 of the inorganic compound layers disposed regularly at spaces of 0.1 to 2 nm (which is the width of the grain boundary phase).

The mean diameter (size) of particles 6 is estimated by measuring the area of a TEM photo square containing about 300 particles (see FIG. 2) and dividing the area by the number of particles assuming that the particles are all circles. Further, we observed lattice images in the particles 6. Therefore, the particles are assumed to be crystal. However, the grain boundary phase 7 has no lattice image and is assumed to be amorphous.

We used the EDX (Energy-Dispersed Characteristic X-Ray Analyzer) of the FE-TEM (Field Emission Type Transparent Electron Microscope) to measure the compositions of the particles 6 and the grain boundary phases 7. The beam diameters for the particles 6 and the grain boundary phases 7 are respectively about 5 nm (for 6) and about 0.5 nm (for 7).

The particles 6 of inorganic compound layer 3 contained 93% by weight of cobalt oxide having the NaCl type crystal structure and 7% by weight of the other oxides $SiO_2$ and $TiO_2$. Similarly, the grain boundary phases 7 contained 75% by weight of cobalt oxide and 25% by weight of the other oxides $SiO_2$ and $TiO_2$. As the result of similar analyses of the other inorganic compound layers, we found that the particles of the inorganic compound layers (except for the comparative examples) contained 65% to 98% by weight of cobalt oxide CoO and the grain boundary phases contained 50% to 90% by weight of cobalt oxide CoO. The other components were $SiO_2$ and $TiO_2$. Judging from the grain size distribution of particles 6, we found that all inorganic compound layers except for No. 6, No. 10, and No. 11 have a "Standard deviation (σ)/grain size×100" value of 25% or under and their sizes (diameters) are uniform.

Next, we formed a magnetic layer 3 of 12 nm thick comprising 69% atomic weight cobalt (Co), 19% atomic weight chrome (Cr) and 12% atomic weight platinum (Pt) on each of the inorganic compound layers 2 (No. 1 to No. 11 in Table 1) by sputtering, using a Co—Cr—Pt alloy as a sputtering target and pure argon as a discharging gas. The discharging gas pressure was 3 mTorr and the supply d.c. power is 300 W/100 mm diameter.

Next, we formed a carbon protective layer 4 of 5 nm thick on the magnetic layer 3, using pure argon as a discharging gas. The discharging gas pressure was 5 mTorr and the supply d.c. power is 800 W/100 mm diameter. Argon gas used in this embodiment can be substituted by a gas containing nitrogen to make the protective layer 4 closer and tighter.

From close observation of surfaces and sections of the magnetic layers 3 formed on the inorganic compound layers 2 except for No. 10 in Table 1 through the electron microscope, we found epitaxial growth of particles on the inorganic compound layer 2 and also found that the particles 6 of the inorganic compound layers are approximately as big as the magnetic particles 14 of the magnetic layer 3.

From the grain size distribution of magnetic particles 14, we found that the "Standard deviation (σ)/grain size ×100" values of inorganic compound layers except for No. 6, No. 10, and No. 11 in Table 1 are 25% or under and that the grain sizes (diameters) are uniform. This is because the magnetic particles 14 in the magnetic layer 3 are affected by the grain sizes and the standard deviation of particles in the inorganic compound layers.

As the result of measurement of magnetic characteristics of the magnetic layer 3, we found that the coercive forces of the inorganic compound layers except for No. 6, No. 10, and No. 11 are 3.0 to 3.8 kOe. Their coercive rectangular ratio S* which is an index of a rectangular hysteresis in the Magnetic Hysteresis loop (M-H loop) (a curve indicating the transition of magnetization M when a magnetic field strength H is applied to a ferromagnetic material) is 0.75 to 0.88. This means that the magnetic layers have excellent magnetic characteristics. This is assumed that the diameters of the magnetic particles 14 of the magnetic layers 3 are small and uniform. Contrarily, the coercive forces of the magnetic layers formed on the inorganic compound layers No. 6, No. 10, and No. 11 were 2 to 2.5 Oe.

As explained above, the magnetic layers formed on the inorganic compound layers No. 6, No. 10, and No. 11 in Table 1 contain particles whose standard deviation of grain sizes is big because the particles of the magnetic layers on the inorganic compound layers are not fully crystallized and their standard deviation of grain sizes is very big. Therefore the magnetic characteristics of the magnetic layer are inferior.

Figure 3:
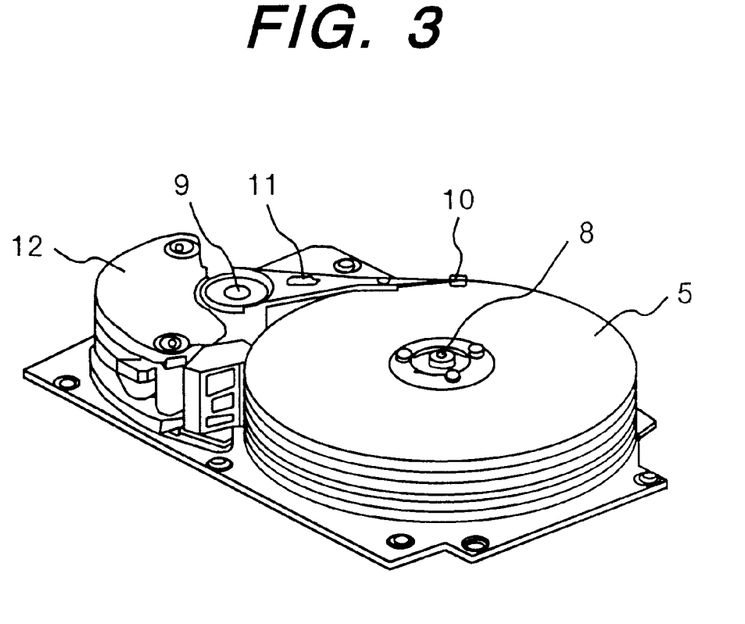
FIG. 3 is a perspective view of a magnetic recording unit.

Then we applied a lubricant to the surface of the protective layer 4, assembled the resulting magnetic recording medium 5 in a magnetic recording/playing unit, and evaluated the recording and playing characteristics of the magnetic recording medium. FIG. 3 shows an external view of the magnetic recording/playing unit.

The magnetic recording/playing unit comprises a plurality of magnetic recording media 5, a media rotating means 8, and a drive unit 9 for driving read/write head units.

The read/write head unit 10 has a play head and a recording head. The recording head comprises an upper magnetic core, a lower magnetic core, and a gap layer. The gap film of the recording head is a soft magnetic layer having high-saturation magnetic flux density of 2.1 T and the gap length is 0.15 μm. The playing head comprises a magnetic head having an enormous magnetic resistance effect.

There is an aerial distance of 20 nm between the magnetic layer of the magnetic recording medium 5 and the surface of the magnetic head facing to the magnetic layer. We wrote a signal equivalent to 20 Gbit/inch$^2$ on the magnetic recording medium 5 and evaluated its S/N characteristics. The magnetic layers 3 of the inorganic compound layers except for No. 6, No. 10, and No. 11 in Table 1 had reproduction outputs of 27 dB to 36 dB. Contrarily, the magnetic layers 3 of the inorganic compound layers No. 6, No. 10, and No. 11 in Table 1 had reproduction outputs of 17 dB to 19 dB.

As the result of measurement of the inversion-of-magnetization units of the magnetic layers by the magnetic force microscope (MFM), we found that the units for the magnetic layers formed on inorganic compound layers except for No. 6, No. 10, and No. 11 in Table 1 are 4 to 5 magnetic particles (14) and small enough.

As the result of measurement of the width of a zigzag pattern existing in the magnetization transition area of each track on the magnetic recording medium 5 by the magnetic force microscope (MFM), we found that the width is 0.1 μm which is much shorter than the gap length of the recording head. We also found generation of no demagnetization due to heat and thermal fluctuation.

This is because the magnetic particles 14 of the magnetic layers 3 have uniform sizes (diameters) and the magnetic interaction of magnetic particles 14 is reduced. It is preferential that the width of the zigzag pattern is smaller than the gap length over the whole tracks, which is not required. This can strikingly reduce noises of the magnetic recording medium.

Further, as the widths of zigzag patterns on the magnetic recording medium in accordance with the present invention are smaller than those of the conventional magnetic recording medium, the tracks can be packed more closely, which enables super-high density recording of 20 Gbit/inch$^2$ or above.

Although this embodiment uses glass substrates as substrate 1, they can be substituted by aluminum substrates, aluminum alloy substrates, or plastic resin substrates. It is also possible to change substrate sizes. Further, additional layers such as a NiP or Co—Cr—Zr layer can be formed on the substrates to improve the surface characteristics of the substrates.

It is possible to use a target comprising cobalt (Co) as amain component, platinum (Pt), at least one of chromium (Cr), tantalum (Ta), and niobium (Nb), and other elements as the components of the magnetic particles in the magnetic layer.

Embodiment 2

This embodiment used targets No. 1 to No. 10 in Table 2 to form inorganic compound layers 2 of FIG. 1. Target No. 1 is a sintered target of NiO, FeO, MgO, TiO, MnO, $Co_3O_4$, $Fe_3O_4$, or any selected from a group of these oxides and target No. 2 is molten soda lime glass ($Na_2O$—$SiO_2$—$CaO$).

TABLE 2

| No. | Target and supply power (W) | | Components of the inorganic compound layer (wt %) | | Inorganic compound layer | | Magnetic layer | | Remarks |
|---|---|---|---|---|---|---|---|---|---|
| | Target 1 | Target 2 | Crystal particle | Grain boundary | Mean grain size (nm) | Standard deviation/ Mean grain size × 100 (%) | Mean grain size (nm) | Standard deviation/ Mean grain size × 100 (%) | |
| 1 | NiO 300W | — | NiO: 100 | — | 2.3 | 25.3 | 21 | 29 | Comparative example |
| 2 | Nio 300W | Soda lime glass 100W | NiO: 88 Glass component: 12 | NiO: 78 Glass component: 22 | 12.3 | 16.1 | 12.2 | 16.1 | — |
| 3 | FeO 300W | Soda lime glass 100W | FeO: 83 Glass component: 17 | FeO: 73 Glass component: 27 | 11.5 | 16.3 | 11.7 | 15.9 | — |
| 4 | FeO + CoO | Soda lime glass 100W | CoO + FeO: 85 Glass component: 15 | CoO + FeO: 75 Glass component: 25 | 10.5 | 17.4 | 10.3 | 18 | — |
| 5 | MgO 300W | Soda lime glass 100W | MgO: 87 Glass component: 13 | MgO: 80 Glass component: 20 | 12.4 | 10.6 | 11.7 | 13.2 | — |
| 6 | TiO 300W | Soda lime glass 100W | Tio: 89 Glass component: 11 | Tio: 69 Glass component: 31 | 13.2 | 9.2 | 11.2 | 16.9 | — |
| 7 | MnO 300W | Soda lime glass 100W | MnO: 91 component: 9 | MnO: 81 component: 19 | 11.5 | 20.1 | 14.2 | 13.9 | — |
| 8 | CoO + NiO + TiO 300W | Soda lime glass 100W | CoO + NiO + TiO: 89 Glass component: 11 | CoO + NiO + TiO: 79 Glass component: 21 | 13.2 | 12.8 | 12.9 | 14.4 | — |
| 9 | $Co_3O_4$ 300W | Soda lime glass 100W | $Co_3O_4$: 82 Glass component: 18 | $Co_3O_4$: 72 Glass component: 28 | 6.5 | 15 | 7.2 | 17 | — |
| 10 | $Fe_3O_4$ 300W | Soda lime glass 100W | $Fe_3O_4$: 85 Glass component: 15 | $Fe_3O_4$: 75 Glass component: 25 | 8.3 | 16.5 | 8.6 | 17.6 | — |

As the result of microscope observation of the surfaces of inorganic compound layers 2, we found that the inorganic compound layers No. 1 to No. 8 have particles 6 of oxides of the NaCl type crystal structure dispersed and the inorganic compound layers No. 9 to No. 10 have particles 6 of oxides of the spinel crystal structure dispersed.

The mean grain size, the short diameter to long diameter ratio, and the standard deviation (σ) of grain size of particles 6 of the inorganic compound layers No. 2 to No. 10 were respectively 6.5 nm to 13.2 nm, 0.7 to 1.0, 9.2% to 20.1% of said mean grain size in that order. The mean grain size and the standard deviation (σ) of grain size of particles in the inorganic compound layer No. 1 were respectively 23 nm and over 25%.

We recognized grain boundary phases 7 having amorphous oxides around particles 6 in the inorganic compound layers No. 2 to No. 10 but no clear grain boundary phase in the inorganic compound layer No. 1.

Therefore, magnetic particles in a magnetic layer 3 formed on each of the inorganic compound layers No. 2 to No. 10 in Table 2 reflect the grain sizes and the standard deviation characteristics of the inorganic compound layers 2.

However, this is not reflected upon the magnetic layer of the inorganic compound layer No. 1. As the result, the grain size of the magnetic particles was 15 nm or above and the standard deviation ($\sigma$) in the grain size distribution exceeded 25%. Therefore, inorganic compound layers No. 2 to No. 10 are preferable for high-density recording of 20 Gbit/inch$^2$ or above.

As explained above, we can prepare a magnetic recording medium fit for high-density recording by using crystal particles 6 containing oxides of NaCi or spinel type crystal structure and an inorganic compound layer comprising amorphous grain boundary phases.

Embodiment 3

This embodiment formed an inorganic compound layer 2 of 30 nm thick on a substrate 1 of FIG. 1 by sputtering a target comprising cobalt oxide CoO and a target comprising soda lime glass ($SiO_2$—$Na_2O$—CaO) to which $Si_3N_4$, TiN, $Fe_2B$ or CoB is added.

The sputtering condition was pure argon (Ar) gas as a discharging gas for sputtering, discharging gas pressure of 2 mTorr, high-frequency power supply of 300 W/mm diameter at the cobalt oxide side, and high-frequency power supply of 200 W/mm diameter at the soda lime glass side.

We heated the substrate at 300 degrees C. during growth of layers. As the result of TEM observation of the surface of each inorganic compound layer, we found that the mean grain size and the short diameter to long diameter ratio were respectively 9.8 nm to 12.5 nm, 0.7 to 1.0 and that each crystal particle is wrapped with an amorphous grain boundary phase. We also found that the particles are crystallized and the standard deviation ($\sigma$) of the grain size in the grain size distribution is 11.9% to 20.1% of the mean grain size.

The grain boundary phase contained $SiO_2$, $NaO_2$, CaO and the additional component of $Si_3N_4$, TiN, $Fe_2B$, or CoB. The grain boundary phase is 0.5 nm to 1.0 nm thick and can be made thicker by adding $Si_3N_4$, TiN, $Fe_2B$ or CoB to the target.

Embodiment 4

This embodiment prepared magnetic recording media No. 1 to No. 7 (see Table 3) using substrates 1 on which an inorganic compound layer 2 is formed under the same condition of No. 3 of Embodiment 1.

TABLE 3

| | | Intermediate layer | | | | Magnetic layer | | | | |
|---|---|---|---|---|---|---|---|---|---|---|
| | Target for intermediate layer | | Mean grain size | Standard deviation/ Mean grain | Lattice con- | Target for magnetic layer | | Mean grain size | Standard deviation/ Mean grain | |
| No. | Target 1 | Target 2 | (nm) | size × 100 (%) | stant ( ) | Target 1 | Target 2 | (nm) | size × 100 (%) | Remarks |
| 1 | Cr100 (Cr: 100 at %) | — | 10.5 | 20.1 | 2.9244 | Co69Cr19Pt12 (Co:69 at %, Cr.19 at %, PT::12 at %) 300W | — | 10.5 | 20.6 | FIG. 4 (a) |
| 2 | Cr90Ti10 (Cr: 90 at %, Ti: 10 at %) 300W | — | 12.3 | 18.1 | 2.9606 | Co69Cr19Pt12 (Co:69 at %, Cr.19 at %, PT::12 at %) 300W | — | 10.3 | 19.5 | |
| 3 | Cr80Ti20 (Cr: 80 at % Ti: 20 at %) 300W | — | 11.5 | 17.9 | 2.9964 | Co69Cr19Pt12 (Co:69 at %, Cr.19 at %, PT::12 at %) 300W | — | 11.5 | 18.3 | |
| 4 | Cr70Ti30 (Cr: 70 at % Ti: 30 at %) 300W | — | 11.2 | 17.3 | 3.0297 | Co69Cr19Pt12 (Co:69 at %, Cr.19 at %, PT::12 at %) 300W | — | 10.8 | 18.2 | |
| 5 | Cr90Ti10 (Cr: 90 at % Ti: 10 at %) 300W | $SiO_2$ + $TiO_2$ ($SiO_2$: $TiO_2$ = 1:1) 100W | 10.5 | 14.9 | — | Co69Cr19Pt12 (Co:69 at %, Cr.19 at %, PT::12 at %) 300W | — | 10.3 | 14.6 | FIG. 4 (b) |
| 6 | Cr90Ti10 (Cr: 90 at % Ti: 10 at %) 300W | $SiO_2$ + $TiO_2$ ($SiO_2$: $TiO_2$ = 1:1) 100W | 10.5 | 14.9 | — | Co69Cr19Pt12 (Co:69 at %, Cr.19 at %, PT::12 at %) 300W | $SiO_2$ + $TiO_2$ ($SiO_2$: $TiO_2$ = 1:1) 100W | 10.5 | 13.4 | FIG. 4 (c) |
| 7 | A magnetic layer is directly formed on the inorganic compound layer without the intermediate layer. | | | | | Co69Cr19Pt12 (Co:69 at %, Cr.19 at %, PT::12 at %) 300W | $SiO_2$ + $TiO_2$ ($SiO_2$: $TiO_2$ = 1:1) 100W | 10.8 | 15.4 | FIG. 4 (d) |

Figure 4A:
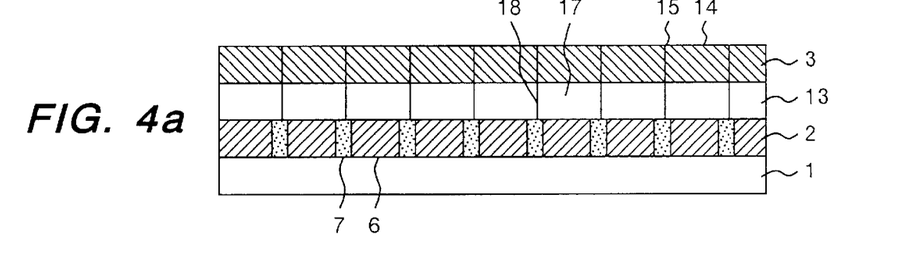
FIG. 4 shows schematic sectional diagrams of magnetic recording media of Embodiment 4.

Each of the magnetic recording media No. 1 to No. 4 has an intermediate layer 4 on the inorganic compound layer 2. These intermediate layers have different Cr and Ti compositions. Each intermediate layer has a magnetic layer 3 on it. FIG. 4(*a*) shows a schematic sectional view of the magnetic recording medium No. 1.

We formed an intermediate layer of 10 nm thick by sputtering a Cr—Ti alloy target; using pure argon as the discharging gas. The discharging gas pressure is 3 mTorr and the supply d.c. power is 800 W/100 mm diameter.

Similarly, we formed a magnetic layer of 12 nm thick by sputtering a Co—Cr—Pt alloy target, using pure argon as the discharging gas. The discharging gas pressure is 3 mTorr and the supply d.c. power is 800 W/100 mm diameter.

As shown in Table 3, the intermediate layers 13 of the magnetic recording media No. 1 to No. 4 had preferable mean grain sizes (diameters) and grain size distributions, reflecting those of the inorganic compound layer 2. Similarly, the magnetic layers 3 also had preferable mean grain sizes (diameters) and grain size distributions, reflecting those of the intermediate layers 13.

The intermediate layer 13 of FIG. 4(*a*) has its particles 17 arranged regularly and separated from each other by grain boundaries 18.

The lattice constant of the intermediate layer 13 can be controlled by the concentration of titanium Ti. By controlling the Ti concentration so that the lattice constant of the intermediate layer 13 may be between the lattice constant of the inorganic compound layer and the lattice constant of the magnetic layer, we can grow the inorganic compound layer, the intermediate layer, and the magnetic layer in sequence more easily and more steadily.

The magnetic layer 3 of FIG. 4(*a*) has its magnetic particles 14 arranged regularly and separated from each other by grain boundaries 15.

Figure 4B:
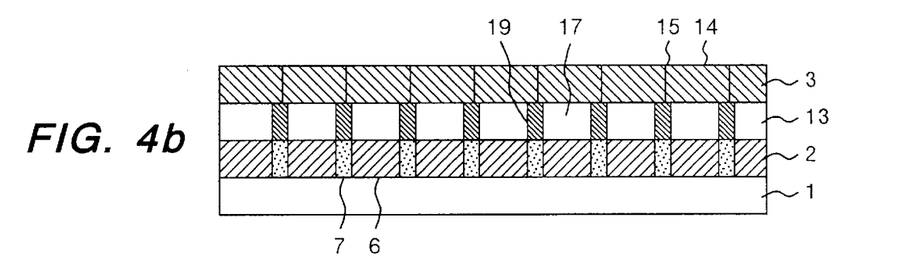

The magnetic recording medium No. 5 forms a magnetic layer 3, an intermediate layer 13 comprising crystal particles 17 and amorphous grain boundary phases 19, and an inorganic compound layer 2 in sequence on the substrate. (See FIG. 4(*b*).)

The intermediate layer 13 is formed by simultaneously sputtering a Cr (90 parts)—Ti (10 parts) alloy target which is the same as those used for formation of the intermediate layer of the magnetic recording medium No. 2 and a sintered target comprising one molar part of silicon oxide and one molar part of titanium oxide.

The magnetic layer 3 of the magnetic recording medium No. 5 was prepared in the same manner as the magnetic layers of the magnetic recording media No. 1 to No. 4. This magnetic layer 3 has a better grain size distribution than the magnetic layers of the magnetic recording media No. 1 to No. 4.

Figure 4C:
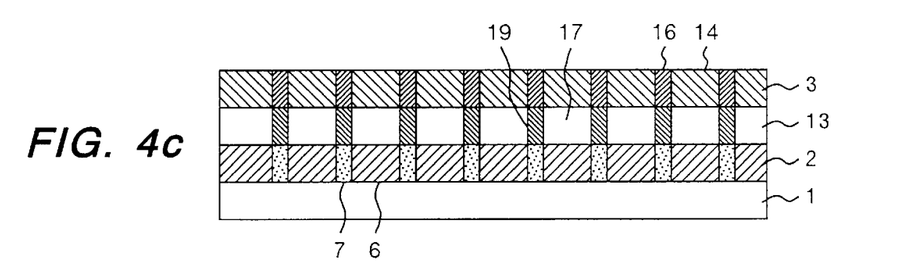

The intermediate layer 13 of the magnetic recording medium No. 6 was prepared in the same manner as the intermediate layer of the magnetic recording medium No. 5. Further a magnetic layer 3 comprising crystal particles 14 and amorphous grain boundary phases 16 was formed on the intermediate layer 4. The magnetic layer 3 of FIG. 4 (*c*) has its magnetic particles 14 arranged regularly and separated from each other by grain boundaries phase 16.

The magnetic layer 3 of the magnetic recording medium No. 6 is formed by simultaneously sputtering a Co—Cr—Pt alloy target which is the same as those used for formation of the magnetic layers of the magnetic recording medium No. 1 to No. 4 and a sintered target comprising one molar part of silicon oxide and one molar part of titanium oxide. This magnetic layer 3 of the magnetic recording medium No. 6 has a better grain size distribution than the magnetic layers of the magnetic recording media No. 1 to No. 4.

Figure 4D:
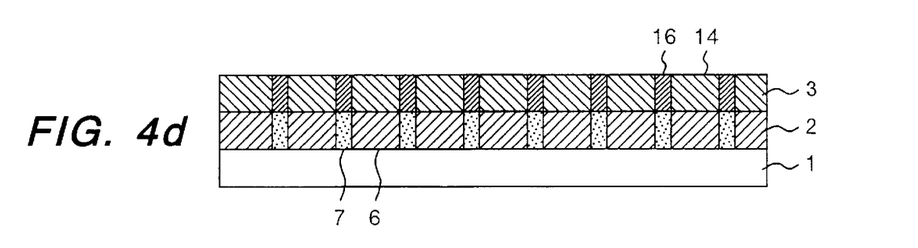

A magnetic layer 3 of the magnetic recording medium 7 comprising crystal magnetic particles and amorphous grain boundary phases is directly formed on the inorganic compound layer 2 without the intermediate layer.

The magnetic layer 3 of FIG. 4(*d*) has its magnetic particles 14 arranged regularly and separated from each other by grain boundaries phase 16.

The magnetic layer 3 of the magnetic recording medium No. 7 was prepared in the same manner as the magnetic layer of the magnetic recording media No. 6. This magnetic layer 3 of the magnetic recording medium No. 7 has a better grain size distribution than the magnetic layers of the magnetic recording media No. 1 to No. 4.

From close TEM observation of surfaces and sections of the layers formed of the magnetic recording media No. 1 to No. 7 in Table 1, we found epitaxial growth of the intermediate layers 13 and the magnetic layers 3 on the inorganic compound layers 2. Magnetic recording media (such as No. 6 and No. 7) which form a magnetic layer 3 comprising magnetic particles and grain boundary phases 16 have a better grain size distribution.

Although this embodiment uses a Cr—Ti alloy material for the intermediate layer 13 to improve the matching between the inorganic compound layer 2 and the magnetic layer 3, the similar effect can be obtained by an alloy containing additional Ti, V, Mo, Mn, B, or W in the Cr component of the Cr—Ti alloy material.

The inorganic compound layer formed on the substrate can control the grain size and the grain size distribution of the intermediate layer formed on the inorganic compound layer. Further the grain size and the grain size distribution of the intermediate layer can be improved by letting the intermediate layer comprise both a particle forming component and a grain boundary phase forming component.

In other words, judging from this embodiment, we found that the grain size and the grain size distribution of the magnetic layer can be improved by formation of an inorganic compound layer and an intermediate layer under the magnetic layer. Further the grain size and the grain size distribution of the magnetic layer can be improved by letting the magnetic layer contain both a particle forming component and a grain boundary phase forming component.

Embodiment 5

For this embodiment, magnetic disks No. 1 to No. 12 (see Table 4) were produced.

We prepared targets as explained below to form inorganic compound layers of magnetic disks No. 1 to No. 12.

We mixed cobalt oxides of mean grain size of 2.3 $\mu$m and 3.2 $\mu$m and $Na_2O$—$SiO_2$—$CaO$ glass or a mixture of finest $SiO_2$ and $TiO_2$ (at a molar ratio of 1:1) at a rate shown in Table 4, added ethyl alcohol to the mixture to make a uniform slurry, dried the slurry into pellets by a spray dryer, pressure-shaped the pellets, hot-pressed and sintered the pressed material. We used the resulting materials as targets.

We sputtered each target by a high frequency power into an inorganic compound layer of 30 nm thick. Table 4 lists the crystal status, mean grain size, standard deviation/mean grain size, and composition of each inorganic compound layer.

Further we formed a 10 nm-thick magnetic layer (Co:Cr:Pt=69:19:12) on each inorganic compound layer, assembled the resulting recording media (magnetic disks) in a magnetic disk unit, wrote data equivalent to 20 Gbit/inch$^2$, read the data, and measured the S/N ratio (in dB). See Table 4.

TABLE 4

| No. | Target composition (wt %) | | Quantity of CoO in inorganic compound layer particles (wt %) | Layer characterristics of inorganic compound layer | | S/N ratio of magnetic disk (dB) | Remarks |
|---|---|---|---|---|---|---|---|
| 1 | CoO: 99.5 | Na$_2$O—SiO$_2$—CaO glass: 0.5 | 99 | Particle: CoO crystal Mean grain size: 17.0 nm Standard deviation/mean grain size × 100: 29% | Grain boundary: Amorphous Grain boundary width: <0.1 nm | 12 | Comparative example |
| 2 | CoO: 98.5 | Na$_2$O—SiO$_2$—CaO glass: 1.5 | 98 | Particle: CoO crystal Mean grain size: 12.0 nm Standard deviation/mean grain size × 100: 18.2% | Grain boundary: Amorphous Grain boundary width: <0.1 nm | 25 | — |
| 3 | CoO: 95 | Na$_2$O—SiO$_2$—CaO glass: 5 | 94.5 | Particle: CoO crystal Mean grain size: 11.2.0 nm Standard deviation/mean grain size × 100: 17.5% | Grain boundary: Amorphous Grain boundary width: <0.5 nm | 32 | — |
| 4 | CoO: 90 | Na$_2$O—SiO$_2$—CaO glass: 10 | 90 | Particle: CoO crystal Mean grain size: 11.0 nm Standard deviation/mean grain size × 100: 16.1% | Grain boundary: Amorphous Grain boundary width: <0.7 nm | 35 | — |
| 5 | CoO: 85 | Na$_2$O—SiO$_2$—CaO glass: 15 | 84.2 | Particle: CoO crystal Mean grain size: 10.2.0 nm Standard deviation/mean grain size × 100: 15.2% | Grain boundary: Amorphous Grain boundary width: <1.2 nm | 34 | — |
| 6 | CoO: 70 | Na$_2$O—SiO$_2$—CaO glass: 30 | 67 | Particle: CoO crystal Mean grain size: 7.2.0 nm Standard deviation/mean grain size × 100: 14.2% | Grain boundary: Amorphous Grain boundary width: <1.8 nm | 29 | — |
| 7 | CoO: 65 | Na$_2$O—SiO$_2$—CaO glass: 45 | 63 | Particle: CoO crystal Mean grain size: 6.0.0 nm Standard deviation/mean grain size × 100: 26.3% | Grain boundary: Amorphous Grain boundary width: <2.9 nm | 11 | Comparative example |
| 8 | CoO: 95 | SiO$_2$ + TiO$_2$: 5 | 95.1 | Particle: CoO crystal Mean grain size: 13.2.0 nm Standard deviation/mean grain size × 100: 16.2% | Grain boundary: Amorphous Grain boundary width: <0.7 nm | 27 | — |
| 9 | CoO: 90 | SiO$_2$ + TiO$_2$: 10 | 89.6 | Particle: CoO crystal Mean grain size: 12.0 nm Standard deviation/mean grain size × 100: 13.3% | Grain boundary: Amorphous Grain boundary width: <0.9 nm | 35 | — |
| 10 | CoO: 85 | SiO$_2$ + TiO$_2$: 15 | 85.3 | Particle: CoO crystal Mean grain size: 12.0 nm Standard deviation/mean grain size × 100: 16.2% | Grain boundary: Amorphous Grain boundary width: <1.1 nm | 33 | — |
| 11 | CoO: 80 | SiO$_2$ + TiO$_2$: 20 | 80.1 | Particle: CoO crystal Mean grain size: 10.0 nm Standard deviation/mean grain size × 100: 13.1% | Grain boundary: Amorphous Grain boundary width: <2 nm | 28 | — |
| 12 | CoO: 65 | SiO$_2$ + TiO$_2$: 45 | 62.5 | Particle: Amorphous Mean grain size: 4.2 nm Standard deviation/mean grain size × 100: 26.3% | Grain boundary: Amorphous Grain boundary width: <2.7 nm | 14 | Comparative example |

The magnetic disk made of target composition No. 1 in Table 4 contains 99% by weight CoO in the particles of the inorganic compound layer and features smaller grain bondary phase width, greater particles in the inorganic compound layer, greater "Standard deviation (σ)/grain size ×100" value and greater particles in the magnetic layer. The resulting S/N ratio of the magnetic disk No. 1 is low.

The magnetic disk made of target composition No. 7 in Table 4 contains 63% by weight CoO in the particles of the inorganic compound layer. The particles in the inorganic compound layer are extremely small and far less crystallized. Therefore, the particles in the magnetic layer are hard to be controlled by the grain characteristics of the inorganic compound layer and the resulting S/N ratio of the magnetic disk No. 1 is low.

The magnetic disk made of target composition No. 10 in Table 4 adds SiO$_2$ and TiO$_2$ instead of the Na$_2$O—SiO$_2$—CaO glass to the main component CoO. We found that the components added to CoO will not change the layer characteristics.

From Table 4, we can easily understand that the S/N ratio of an inorganic compound layer is 25 or above when the particles in the inorganic compound layer contains 65% to 98% by weight CoO. (For example, see target compositions No. 2 to No. 6 and Mo. 8 to No. 11.)

Therefore, the target should preferably contain 65% to 98% by weight CoO to get inorganic compound layers having such layer characteristics.

Further, the width of a grain boundary phase in the inorganic compound layer can be controlled by the ratio of the grain boundary phase material in the target composition. When the width of the grain boundary phase is 0.1 nm to 2 nm, we can get an optimum distance between magnetic particles in the magnetic layer and reduce the interaction of magnetic particles in the magnetic layer. The resulting magnetic disk has a greatly-reduced unit of inversion of magnetization for recording and deletion.

This embodiment uses target compositions of "CoO and Na$_2$O—SiO$_2$—CaO glass" and "CoO and SiO$_2$ plus TiO$_2$,"

but cobalt oxide CoO can be substituted by an oxide having the NaCl or spinel type crystal structure. Similarly, the $Na_2O$—$SiO_2$—CaO glass or $SiO_2$ plus $TiO_2$ can be substituted by oxides, nitrides, or borides of elements belonging to Groups I to V of the periodic table to get the similar effect.

As explained above, we can control particle materials, grain boundary phase materials, concentrations (rates of components), layer orientations, particle sizes (diameters), grain boundary phase thickness, and grain size distribution of each layer (inorganic compound layer, intermediate layer, and magnetic layer) by selecting materials or changing conditions of layer formation. Crystal particles in each layer should preferably be so oriented that the lattice constants of the particles may be matched easily.

The glass used as substrates 1 in this embodiment can be substituted by high molecular materials such as polyethylene, polyester, polyolefin, cellulose, polyvinyl chloride, polyimide, and polycarbonate, metallic materials such as aluminum, aluminum alloy, and titanium alloy, ceramics glass such as aluminum glass, or composite materials of these. The substrate shapes can be any of disk, tape, film, sheet, card, and drum.

There are two ways of recording information on the magnetic recording media: recording along the surface of the magnetic recording medium and recording perpendicularly to the surface of the magnetic recording medium.

The magnetic recording medium for recording along the surface uses cobalt alloy or the like of the hexagonal close-packed structure. The cobalt alloy layer has a one-axis anisotropy with the "c" axis as a magnetizable axis, the "c" axes are oriented along the surface of the layer.

Similarly, the magnetic recording medium for recording vertical to the surface uses cobalt alloy or the like of the hexagonal close-packed structure and the "c" axes are oriented vertically to the surface of the layer. The orientation of the axis in the magnetic layer can be controlled also by formation of an inorganic compound layer or an intermediate layer formed between the inorganic compound layer and the magnetic layer. Therefore, the present invention is applicable to both of the above recording ways.

The present invention has an effect of making crystal particles in the magnetic layer fine and uniform fit for high-density recording:

What we claim is:

1. A magnetic recording medium comprising:
   a substrate;
   an information-recording magnetic layer formed on said substrate; and
   an inorganic compound layer, containing crystal particles and amorphous grain boundary phases surrounding said particles, formed between said substrate and said magnetic layer;
   wherein said inorganic compound layer comprises a first component material and a second component material, wherein said first component material comprises a material having a sodium chlorides crystal structure or a material that is a spinal crystal oxide, and said second component material contains at least one selected from the group consisting of oxides, nitrides, and borides of elements belonging to groups I to V of the periodic table; and
   wherein said magnetic layer contains crystal magnetic particles whose mean grain size is 4 nm to 15 nm and the standard deviation (σ) of the grain size is 25% or less of said mean grain size.

2. A magnetic recording medium comprising:
   a substrate;
   an information-recording magnetic layer formed on said substrate; and
   an inorganic compound layer, containing crystal particles and amorphous grain boundary phases surrounding said particles, formed between said substrate and said magnetic layer;
   wherein said inorganic compound layer comprises a first component material and a second component material, wherein said first component material comprises a material having a sodium chloride crystal structure or a material that is a spinel crystal oxide, and said second component material contains at least one selected from the group consisting of oxides, nitrides, and borides of elements belonging to groups I to V of the periodic table; and wherein said crystal particles and said grain boundary phases both contain first component material, and said particles contain more first component than said grain boundary phases.

3. The magnetic recording medium according to claim 2, wherein said crystal particles contain 65–98% by weight of the spinal crystal oxide first component material, and 35–2% by weight of the second component material selected from the group consisting of oxides, nitrides, and borides of elements belonging to groups I to V of the periodic table; and said grain boundary phases contain 50–90% by weight of the spinel crystal oxide first component material, and 50–105 by weight of the second component material selected from the group consisting of oxides, nitrides, and borides of elements belonging to groups I to V of the periodic table.

4. The magnetic recording medium according to claim 2, wherein the material having a sodium chloride (NaCl) crystal structure is selected from the group consisting of CoO, $Fe_2O_3$, magnesium oxide, manganese oxide, titanium oxide, copper oxide, and nickel oxide.

5. The magnetic recording medium according to claim 2, wherein the spinel crystal oxide material is selected from the group consisting of $Co_3O_4$ and $Fe_3O_4$.

6. A magnetic recording medium according to claim 2, wherein mean grain size, standard deviation (σ) of grain size, short diameter to long diameter ratio of said crystal particles, and grain boundary phase width are 4 nm to 15 nm, 25% or less of said mean grain size, 0.7 to 1.0, and 0.1 nm to 2 nm, respectively.

7. A magnetic recording medium according to claim 2, wherein said magnetic layer is made of an alloy containing cobalt.

8. A magnetic recording medium according to claim 2, wherein said magnetic layer comprises crystal magnetic particles and amorphous grain boundary phases surrounding said magnetic particles.

9. A magnetic recording medium according to claim 2, further comprising an intermediate layer between said inorganic compound layer and said magnetic layer;
   wherein said intermediate layer contains crystal particles whose mean grain size is 4 nm to 15 nm and the standard deviation of the grain size (σ) is 25% or less of said mean grain size.

10. A magnetic recording medium according to claim 9, wherein said intermediate layer is a Cr-related intermediate layer, wherein said Cr-related intermediate layer comprises a mixture of a first composition and a second composition, said first composition containing Cr, and consisting of oxides, nitrides, and borides of an element belonging to groups I to V of the periodic table, said Cr-related intermediate layer comprising amorphous grain boundaries surrounded by crystal particles.

11. A magnetic recording medium according to claim 1, wherein said magnetic layer is a ferromagnetic layer which is an alloy of Co as a main component, Pt, and at least one selected from the group consisting of Cr, Ta and Nb.

12. A magnetic recording medium according to claim 11, wherein said at least one selected from the group consisting of Cr, Ta and Nb is deposited between crystal particles in said ferromagnetic layer.

13. A magnetic recording medium according to claim 1, wherein the magnetic layer contains magnetic particles, with at least one of oxide, nitride and boride of elements belonging to Groups I to V of the periodic table deposited in the boundaries between magnetic particles.

14. A magnetic recording medium according to claim 1, wherein the difference in the lattice constant between that of crystals of magnetic particles of the magnetic layer and the crystal particles of the inorganic compound layer is at most ±10%.

15. A magnetic recording medium according to claim 9, wherein said intermediate layer includes at least one selected from the group consisting of oxide, nitride and boride of elements belonging to Groups I to V of the periodic table deposited in the boundaries between the crystal particles of the intermediate layer.

16. A magnetic recording medium according to claim 1, wherein said inorganic compound layer has a thickness in the range of 5 nm to 50 nm.

17. A method for manufacturing the magnetic recording medium of claim 2, wherein the inorganic compound layer is formed by simultaneously sputtering from a first target and a second target, said first target comprising a spinel crystal oxide material or a material having a sodium chloride crystal structure, and said second target comprises at least one selected from the group consisting of oxides, nitrides, and borides of elements belonging to groups I to V of the periodic table.

18. A method for forming the magnetic recording medium of claim 2, wherein the inorganic compound layer is formed by sputtering from a target comprising a mixture of a first component material and a second component material, said first component material comprising a spinel crystal oxide or a material having a sodium chloride crystal structure, and said second component material comprises at least one selected from the group consisting of oxides, nitrides, and borides of elements belonging to groups I to V of the periodic table.

19. A method of manufacturing the magnetic recording medium of claim 1, wherein the magnetic layer is formed by simultaneously sputtering from a first target and a second target, said first target comprising Co, Pt and at least one element selected from the group consisting of Cr, Ta, and Nb, and the second component comprises at least one selected from the groups consisting of oxides, nitrides, and borides of elements belonging to groups I to V of the periodic table.

20. A method for forming the magnetic recording medium of claim 1, wherein the magnetic layer is formed by sputtering from a target comprising a mixture of Co, Pt, and at least one element selected from the group consisting of Cr, Ta, and Nb, said mixture further comprising at least one selected from the group consisting of oxides, nitrides, and borides of elements belonging to groups I to V of the periodic table.

* * * * *